United States Patent
Hausmann et al.

(10) Patent No.: US 7,123,703 B2
(45) Date of Patent: Oct. 17, 2006

(54) DIFFERENTIATED THRESHOLD VALUE BEHAVIOR IN PREPAID SERVICES

(75) Inventors: Rüdiger Hausmann, Penzberg (DE); Peter Moritz, Haar (DE)

(73) Assignee: Siemens Aktiengesellschaft, Munich (DE)

( * ) Notice: Subject to any disclaimer, the term of this patent is extended or adjusted under 35 U.S.C. 154(b) by 18 days.

(21) Appl. No.: 10/474,674

(22) PCT Filed: Feb. 27, 2002

(86) PCT No.: PCT/DE02/00716

§ 371 (c)(1),
(2), (4) Date: Oct. 14, 2003

(87) PCT Pub. No.: WO02/084613

PCT Pub. Date: Oct. 24, 2002

(65) Prior Publication Data

US 2004/0114739 A1  Jun. 17, 2004

(30) Foreign Application Priority Data

Apr. 12, 2001 (EP) ................... 01109180

(51) Int. Cl.
*H04M 11/00*  (2006.01)
*H04M 15/00*  (2006.01)

(52) U.S. Cl. ................ 379/114.2; 379/121.3; 455/406; 455/407

(58) Field of Classification Search ........... 455/405, 455/406, 407, 408; 379/114.19, 114.2, 126, 379/121.01, 127.04, 114.17, 114.01

See application file for complete search history.

(56) References Cited

U.S. PATENT DOCUMENTS

| 5,107,494 A | | 4/1992 | Johnson et al. |
| 5,559,871 A | * | 9/1996 | Smith .................. 379/115.01 |
| 5,719,926 A | | 2/1998 | Hill |
| 5,898,915 A | * | 4/1999 | Reininghaus et al. ........ 455/406 |
| 6,131,024 A | * | 10/2000 | Boltz ..................... 455/405 |
| 6,529,593 B1 | * | 3/2003 | Nelson .................... 379/114.2 |
| 6,665,387 B1 | * | 12/2003 | Hannu .................... 379/114.16 |
| 2002/0106064 A1 | * | 8/2002 | Bekkevold et al. ...... 379/114.2 |
| 2003/0078031 A1 | * | 4/2003 | Masuda ................. 455/406 |
| 2003/0101135 A1 | * | 5/2003 | Myatt et al. .............. 705/40 |

FOREIGN PATENT DOCUMENTS

| EP | 0 705 019 | 4/1996 |
| JP | 2-244964 | 9/1990 |
| WO | WO 99/25106 | 5/1999 |
| WO | WO 99/57883 | 11/1999 |

* cited by examiner

Primary Examiner—Binh K. Tieu

(57) ABSTRACT

The invention relates to a method for threshold value relates control of at least one service in a data or telecommunication system, comprising the following steps: a) defining at least one threshold value for a prepaid credit for the payment of said service; b) defining at least one action, especially control of the scope of said service, in the framework of said service, said action being able to be triggered at said threshold value; c) signalling if the threshold value(s) is/are exceeded or not respected; and d) triggering the action in response to the signal.

9 Claims, 3 Drawing Sheets

| Country | Tariff for Card Value in DM | | | Call Credit in Minutes for Card Values | | | |
|---|---|---|---|---|---|---|---|
| | 10+25 DM | 50+75 DM | | 10 DM | 25 DM | 50 DM | 75 DM |
| Germany | 0,19 | 0,17 | | 52 | 131 | 292 | 438 |
| Australia | 0,40 | 0,36 | | 25 | 62 | 138 | 208 |
| Brazil | 0,67 | 0,60 | | 14 | 37 | 82 | 124 |
| China | 0,51 | 0,46 | | 19 | 49 | 108 | 163 |
| Dominican Rep. | 0,50 | 0,45 | | 20 | 50 | 111 | 166 |
| Greece | 0,55 | 0,50 | | 18 | 45 | 101 | 151 |
| UK | 0,25 | 0,23 | | 40 | 100 | 222 | 333 |
| Canada | 0,28 | 0,25 | | 35 | 89 | 198 | 297 |
| Philippines | 0,51 | 0,46 | | 19 | 49 | 108 | 163 |
| Russia | 0,44 | 0,40 | | 22 | 56 | 125 | 187 |
| Turkey | 0,42 | 0,38 | | 23 | 59 | 132 | 198 |
| USA | 0,18 | 0,16 | | 55 | 138 | 308 | 462 |

FIG.3
Prior Art

DIFFERENTIATED THRESHOLD VALUE BEHAVIOR IN PREPAID SERVICES

CLAIMS PRIORITY

This application is a national stage application of International Application No. PCT/DE02/00716 which was published in the German language on Oct. 24, 2002 and which claims the benefit of priority to European Application No. 01109180.8, which was filed in the German language on Apr. 12, 2001.

TECHNICAL FIELD OF THE INVENTION

The invention relates to a method for threshold-value-related control of at least one service in a data or telecommunication system.

BACKGROUND OF THE INVENTION

Services paid for in advance, particularly services in a data or telecommunication system, are also known as prepaid services, an electronic credit being built up with a service provider e.g. by means of cashless transfer or cash purchase of a telephone card (prepaid card) by the user. The service provider's services booked in this manner can then be selected cashlessly by the user from any touch-tone telephone, from a telephone booth, in a hotel etc. via a toll-free service number and used e.g. by entering a user ID. Services of this kind can also be used from a mobile telephone, correspondingly attractive tariff plans being possible for the service operators through pre-payment of the service charges. Generally tariff models tailored to the user's requirements are provided, e.g. for the preferred use of international or national connections, local or long-distance calls, etc.

The scope of the services offered extends not only to voice communication using fixed or mobile telephones, but also to text-based communication services such as e-mail or SMS (Short Message Service). In addition, services such as voice mail (answering machine function), Internet access (WAP phone, Internet computer) or reduced-rate services such as travel information, telephone information etc. can be provided. The advantages of using a service package of this kind have so far resulted in an increasing number of users. However, the disadvantage of the present system is that, if credit runs out while a service is being used, the line is cut off which means that it is no longer possible for the user to top off his credit in good time. This is all the more unacceptable for the user in that cut-off may occur while an important service is being used, e.g. an important international call, and can have serious consequences.

SUMMARY OF THE INVENTION

According to an aspect of the invention, a method is provided for permitting a flexible response to varying credit balances for prepaid services. The method according to this aspect of the invention includes setting at least one threshold value for a prepaid credit for payment of said service, defining at least one action, particularly control of the scope of said service, within the framework of said service, said action to be triggered at said threshold value, signaling if credit falls below or exceeds a threshold value, and triggering the action in response to the signal.

According to an aspect of the invention, a differentiated decision on reaching a (specifically lower) threshold of an electronic credit in favor of a flexible reaction of the user is implemented.

A flexible reaction can be made possible particularly if a threshold value is replaced by a number of threshold values to which at least one action is finally assigned in each case. The resulting possibilities for providing flexibility in the threshold value behavior of a prepaid service allow the user to replenish his electronic credit according to his specific requirements or to terminate the use of a service in an orderly manner.

The action triggered when a threshold value is reached includes the activation or deactivation of an assigned service. For example, when an upper threshold value is reached, particularly cost-intensive services are turned off first in order to enable less expensive services to be provided for as long as possible. The line will not be finally cut off until a lower credit threshold is reached.

A particular advantage of this is that the action triggered when a threshold value is reached includes the modification of service parameters, particularly charging, rating or grade of service. As a result, simple activation or deactivation of a service is replaced by a significantly differentiated handling of the payment modalities. Thus, for example, it would still be possible, on reaching an upper threshold value, to use a service at low monthly charges and on a relatively inexpensive tariff, whereas, if the credit falls below this threshold value, said tariff will no longer be offered or the grade of service, e.g. the possibility of making international calls, will be restricted. Such a restriction of service parameters over a number of threshold values down to a lower threshold value has the effect of motivating the user to top off his electronic credit in good time.

When setting at least one threshold value for a credit balance, the threshold value is preferably selected in accordance with user data, in particular the scope of service booked by the user and/or the amount of prepaid credit. Thus, for example, for a user with a high prepaid credit balance and a booked scope of service including not only telephone but also Internet services, an upper threshold value for triggering scope-of-service restricting actions can be set much lower than for a user with a low prepaid credit balance and a very restricted booked scope of service in the form of a purely telephone service.

The action triggered when a threshold value is reached is also preferably selected in accordance with user data, in particular the scope of service booked by the user and/or the amount of prepaid credit. Thus, when setting, as part of the service, at least one action to be triggered at a threshold value, the booked Internet service can be deactivated and the memory size for SMS messages can be restricted, for example, at this threshold value for a user with a low prepaid credit balance, whereas in the case of a user with a considerably higher prepaid credit balance, only the service parameters, e.g. the underlying telephone tariff, will be modified on reaching the same threshold value. Here the user is motivated to build up sufficient electronic credit well in advance for high-grade services and a "moderate" reaction when the credit falls below a threshold value.

Another advantage is achieved by attaching an additional condition that must be fulfilled before the action or actions set to be triggered at a threshold value can be initiated, signaling of the occurrence or non-occurrence of the condition taking place after signaling that the credit exceeds or has fallen below the threshold value. By assigning a condition to at least one threshold value, it is possible to influence the response of further parameters and therefore to tailor the solutions to a customer's requirements.

This is particularly relevant when the size of the user's prepaid credit and/or the booked scope of service and/or the service being used is part of a condition. If, e.g., in the case of a prepaid credit of DM 100.00 and a booked scope of service of telephone service (international, national), voice mail and SMS, and while a long-distance call is in progress, credit fall below an upper threshold value of DM 15.00, the action of modifying service parameters, e.g. restricting the voice mail capacity, is initially triggered. If, on the other hand, the user is only making a local call when the credit balance falls below this threshold value, initially no action will be triggered.

When the credit balance falls below a threshold value thereby signaling the triggering of an action, the user is preferably informed, in response to the signal, of the status of his credit and/or of the scope of service currently applicable to him. In the example described above, the long-distance caller can be additionally informed that his electronic credit is currently DM 15.00 and that the scope of service, i.e. his voice mail capacity, has been restricted in favor of the call in progress. This means that the user is reminded in good time to top off his electronic credit.

According to an aspect of the invention, it is advantageous from the service provider's standpoint that all the threshold values, actions and conditions for a plurality of users are managed at a central point of a computer network. This kind of central administration of services is non-labor-intensive and provides a correspondingly good overview of the cost-effectiveness and status of the operation as well as statistical analysis of user behavior. A software package running on a central server of a data and communications network is particularly suitable for supporting this aspect of the invention.

The threshold value behavior of prepaid services can be further differentiated by setting a number of threshold values, each triggering at least one action. It is possible to graduate the threshold values in such a way that the actions triggered when credit falls below or exceeds said threshold values incrementally restrict the scope of service and the service parameters or extend them again when the electronic credit is topped off by the user. The actions triggered at graduated threshold values can initiate e.g. restriction of possible telephone connections to the local network, simultaneous deactivation of the SMS function with simultaneous modification of the basic call charges.

In addition, it is also possible to assign at least one condition to each of a plurality of threshold values, the threshold values likewise being graduated such that the condition, of which there are at least one, assigned thereto enables graduated restriction or extension when credit falls below or exceeds individual threshold values. Thus, for example, Internet access via a WAP-enabled mobile phone can be deactivated when credit falls below a threshold value of DM 10.00, but an SMS service can be activated by another condition assigned to this threshold value, depending on the original prepaid credit, and when Internet access has been deactivated.

The above-mentioned graduation can be undertaken particularly from the point of view that the user is informed in good time about the current scope of the services used by him and his available credit without complete line cut-off occurring immediately. This enables him to top off his credit balance in good time and in a differentiated manner, which means that the average available credit on the user's account is also increased. For the service operator, this allows the quality of the offer to be further increased while at the same time providing cheaper prices.

BRIEF DESCRIPTION OF THE DRAWINGS

The present invention will now be explained in greater detail with reference to the accompanying drawings:

FIG. 3 shows a phone card (prepaid card) tariff table according to the prior art.

DETAILED DESCRIPTION OF THE PREFERRED EMBODIMENTS

Figure 1:
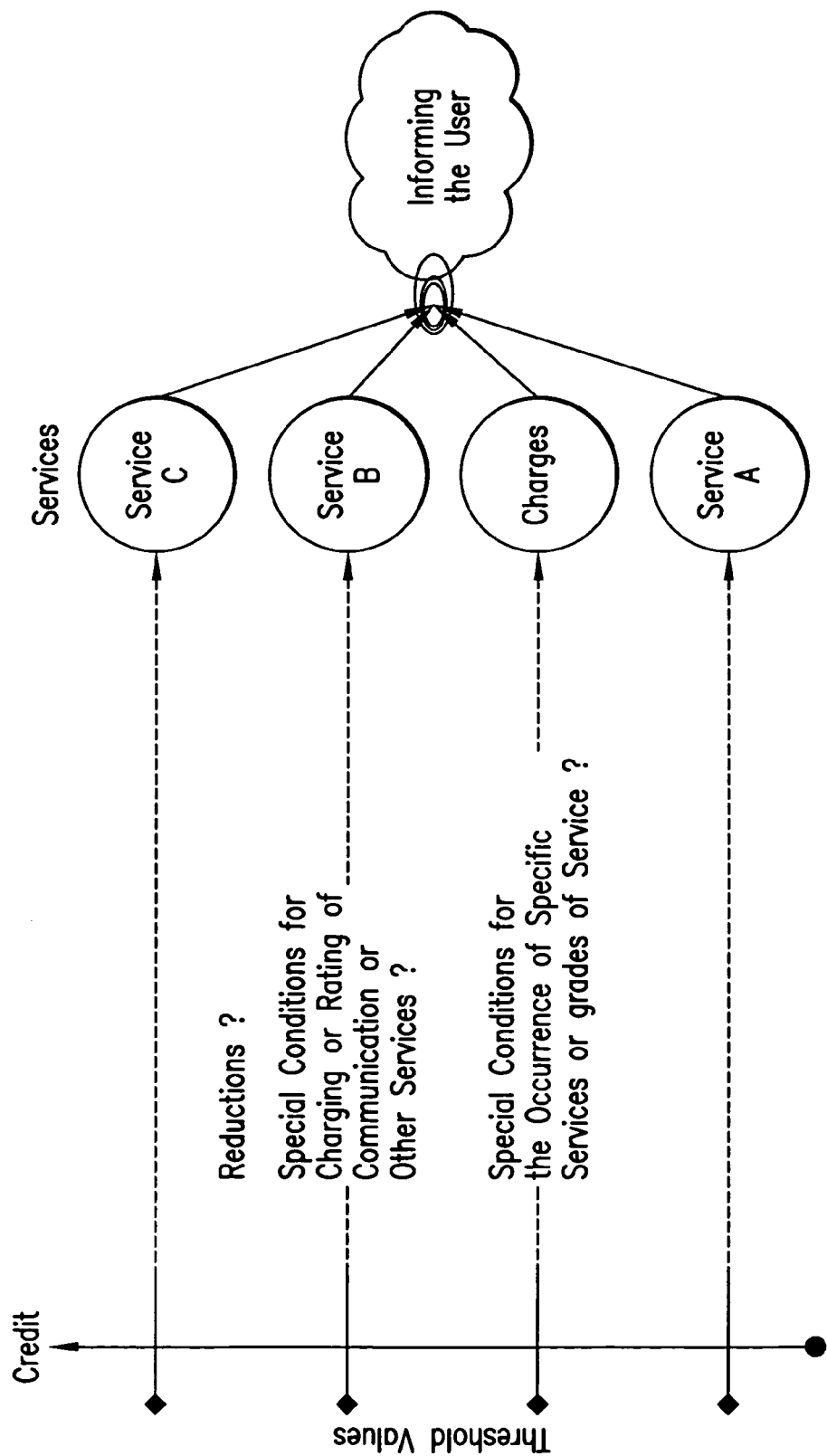
FIG. 1 shows the functional relationship between the threshold values of an electronic credit and the services triggered when the credit falls below or exceeds said threshold values.

FIG. 1 shows, on the left-hand side, a scale of threshold values for an electronic credit. When the credit falls below or exceeds said threshold values, the services on the right-hand side, indicated by the arrows, are triggered, reductions in the form of corresponding charging and/or rating and/or grade of service being basically assignable to each threshold value. When corresponding reductions come into force, these are set by the charges service shown on the right and notified to the user in a further step.

The threshold values can be assigned special conditions for the charging or rating of communication or other services. An assigned condition could be e.g. such that, subject to a prepaid credit of DM 50.00 and the credit simultaneously falling below the threshold, activation of the charges service is triggered, which triggers the taking of an increased charge as the basis for billing a service. Conversely, however, if a prepaid credit of DM 100.00 is paid for and the credit falls below the same threshold, no action is yet triggered. By assigning conditions to individual threshold values, the rating, for example, can therefore be selectively influenced by the triggering or non-triggering of actions.

In addition, particular conditions for the occurrence of services or grades of service can be formulated which trigger the activation or deactivation of a service when the credit falls below or exceeds a threshold value. Thus, when credit falls below the highest threshold value in the case of a prepaid credit of DM 100.00, the grade of service of a service, e.g. the possibility of international calls, can be deactivated, but in the case of a prepaid credit of DM 50.00 the telephone service can be cut off completely at the same threshold value. For the functional relationship shown here, the user is informed, e.g. about the state of the credit and the scope of services currently available to him.

Figure 2:
FIG. 2 shows the functional relationship between the threshold values of an electronic credit and the services triggered when the credit falls below or exceeds said threshold values with reference to a service example and the assigned service server.

FIG. 2 shows the functional relationship between a threshold value scale of an electronic credit and the thereby activated or deactivated services with reference to service examples and the assigned service servers.

If, for example, the electronic credit falls below the highest threshold value, a previously active and location-based service C is switched to an active and non-location-based state. This takes place in the present example by setting call barring and simultaneously offering a location-based replacement service. Both services run on the HLR (Home Location Register) server. If the credit falls below the next threshold value, a previously activated service B is deactivated. In the present example, a voice-prompted menu dialog is replaced by self-entry of the appropriate digits. This affects the SMAP (Service Management Access Point) server.

When the electronic credit falls below the next threshold, a charges service is activated which sets the tariff for SMS messages (Short Message Service) from a discount level II to a discount level I, less favorable discounting coming into effect for SMS in terms of a discount schedule for prepaid services. This service is activated on the Prepaid Service Center server. Finally, if the credit drops below the lowest threshold value, a service A is activated which changes a grade of service I to a grade of service II, causing the voice mail memory size to be reduced, the service A being initiated on the Voice Mail Server.

FIG. 3 shows a telephone call tariff table based on a special tariff offer for card values of DM 10.00 and DM 25.00 as well as DM 50.00 and DM 75.00. The call credits in minutes for the corresponding card values, depending on the connection, are also listed. For lower prepaid card values of e.g. DM 10.00 and DM 25.00, correspondingly higher charges are assessed for the call minutes than in the case of card values of DM 50.00 and DM 75.00. The connection times to the relevant countries are correspondingly lower for card values of DM 10.00 and DM 25.00. Threshold values for differentiated reaction to the reaching of a minimum credit state are not provided in this tariff according to the prior art.

The invention claimed is:

1. A method for threshold-value-related control of at least one service in a data or telecommunication system, comprising:
   a) setting at least one threshold value for a prepaid credit, which is administered at a central point of the system, for the payment of the service;
   b) setting at least one action which includes at least control of a scope of service, within the framework of the service, which is to be triggered at the threshold value;
   c) administering all threshold values, actions and conditions for a plurality of users at a central point of a computer network;
   d) signaling if credit exceeds or falls below the threshold value; and
   e) triggering the at least one action in response to the signal, wherein
      a plurality of threshold values each trigger at least one action and an assignment of at least one of the actions and conditions to the threshold values is made in such a way that, when the credit exceeds or falls below successive threshold values, the scope of services other than the service currently being used are progressively restricted or extended.

2. The method according to claim 1, wherein the action includes activation or deactivation of the service.

3. The method according to claim 1, wherein the action includes modifying service parameters which include at least one of charging, rating or grade of service.

4. Method according to claim 1, wherein, in a), the threshold value is selected in accordance with user data which includes at least one of the scope of service booked by the user and the amount of the prepaid credit.

5. The method according to claim 1, wherein, in b), the action is selected in accordance with user data which includes at least one of the scope of service booked by the user and the amount of the prepaid credit.

6. The method according to claim 1, further comprising:
   b1) setting an additional condition for the action after the setting of at least one action; and
   d1) signaling an occurrence or non-occurrence of the condition after the step of signaling if credit exceeds or falls below the threshold value.

7. The method according to claim 6, wherein, in b1), at least one of the amount of the user's prepaid credit, the booked scope of service and the service currently being used is part of the additional condition.

8. The method according to claim 1, further comprising, after e):
   f) informing the user of at least one of a status of the credit and of the scope of service currently applicable to the user.

9. The method according to claim 1, wherein a plurality of threshold values are each assigned at least one condition.

* * * * *